US010263509B2

(12) United States Patent
Daley et al.

(10) Patent No.: US 10,263,509 B2
(45) Date of Patent: Apr. 16, 2019

(54) OPTIMIZING POWER FACTOR CORRECTION BETWEEN VOLTAGE REGULATORS

(71) Applicant: COOPER TECHNOLOGIES COMPANY, Houston, TX (US)

(72) Inventors: Daniel J. Daley, Waukesha, WI (US); Craig A. Colopy, Brookfield, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 74 days.

(21) Appl. No.: 15/356,824

(22) Filed: Nov. 21, 2016

(65) Prior Publication Data
US 2017/0070134 A1  Mar. 9, 2017

Related U.S. Application Data

(62) Division of application No. 13/782,962, filed on Mar. 1, 2013, now Pat. No. 9,513,645.
(Continued)

(51) Int. Cl.
*G05F 1/14*     (2006.01)
*H02M 1/42*    (2007.01)
*H02M 5/10*    (2006.01)

(52) U.S. Cl.
CPC ............... *H02M 1/42* (2013.01); *G05F 1/14* (2013.01); *H02M 1/4216* (2013.01); *H02M 5/10* (2013.01); *Y02B 70/126* (2013.01); *Y02P 80/112* (2015.11)

(58) Field of Classification Search
CPC ...... G05F 1/70; G05F 1/14–1/22; G05F 1/66; H02M 1/42; H02M 1/4216; H02M 5/10;
(Continued)

(56) References Cited

U.S. PATENT DOCUMENTS 4,413,189 A   11/1983   Bottom, Jr.
4,860,145 A    8/1989   Klingbiel
(Continued)

FOREIGN PATENT DOCUMENTS

BR   PI0404107-0 A    5/2006
BR   PI0604133-7 A   10/2008
(Continued)

OTHER PUBLICATIONS

The International Search Report and Written Opinion For Related Application PCT/US2013/028719, dated Jun. 30, 2013, 11 pages.
(Continued)

*Primary Examiner* — Jue Zhang
*Assistant Examiner* — Lorena D Bruner
(74) *Attorney, Agent, or Firm* — King & Spalding, LLP

(57) ABSTRACT

Systems and methods for optimizing power factor correction between voltage regulators are described herein. The system can include a leader voltage regulator controller coupled to a first voltage regulator and a follower voltage regulator controller coupled to both a second voltage regulator and the leader voltage regulator controller. The leader voltage regulator controller can determine a difference in measured power factors between the first voltage regulator and the second voltage regulator. The leader voltage regulator controller can also initiate an adjustment of a tap position of the first voltage regulator or the second voltage regulator. Alternatively, instead of leader and follower voltage regulator controllers, the system can utilize a single connected voltage regulator controller that determines differences in measured power factors between a first voltage regulator and a second voltage regulator and initiates an adjustment in a tap position(s) when appropriate.

20 Claims, 10 Drawing Sheets

Related U.S. Application Data

(60) Provisional application No. 61/605,643, filed on Mar. 1, 2012.

(58) Field of Classification Search
CPC ... H02M 1/4208; Y02B 70/126; Y02B 80/112
See application file for complete search history.

(56) References Cited

U.S. PATENT DOCUMENTS

| | | | |
|---|---|---|---|
| 5,136,233 | A | 8/1992 | Klinkenberg et al. |
| 5,155,672 | A | 10/1992 | Brown |
| 5,428,551 | A | 6/1995 | Trainor et al. |
| 5,450,002 | A | 9/1995 | Dunk |
| 5,498,954 | A | 3/1996 | Bassett et al. |
| 5,581,173 | A | 12/1996 | Yalla et al. |
| 6,841,976 | B1 | 1/2005 | Sen et al. |
| 7,023,193 | B2 | 4/2006 | Champion et al. |
| 7,049,795 | B2 | 5/2006 | Beckwith |
| 7,408,275 | B2 | 8/2008 | Hernandez et al. |
| 7,482,714 | B2 | 1/2009 | Rapant et al. |
| 7,595,614 | B2 | 9/2009 | Stich et al. |
| 7,615,965 | B2 | 11/2009 | Popescu-Stanesti et al. |
| 7,915,766 | B2 | 3/2011 | Hernandez et al. |
| 8,493,754 | B1 | 7/2013 | Wambsganss et al. |
| 8,502,420 | B1 * | 8/2013 | Mogilevski ....... H02M 3/33561 307/151 |
| 8,866,451 | B2 * | 10/2014 | Iwata ................. H02M 1/4225 323/222 |
| 2005/0099741 | A1 | 5/2005 | Stenestam et al. |
| 2005/0213356 | A1 | 9/2005 | Yanagida et al. |
| 2007/0090811 | A1 | 4/2007 | Labuschagne |
| 2008/0129524 | A1 | 6/2008 | Kondo et al. |
| 2010/0198422 | A1 | 8/2010 | Feng |
| 2011/0278931 | A1 | 11/2011 | Johnson, Jr. |
| 2011/0320058 | A1 | 12/2011 | Rietmann et al. |
| 2012/0262958 | A1 * | 10/2012 | Feldtkeller ......... H02M 1/4225 363/44 |

FOREIGN PATENT DOCUMENTS

| | | |
|---|---|---|
| EP | 1113546 A1 | 7/2001 |
| EP | 1358499 B1 | 4/2010 |

OTHER PUBLICATIONS

Tapeletro, TAP Electro Sistemas Ltda., "Single Phase Voltage Regulator Sychronizer", R.U.A 01, User's Manual, Rev. Jan. 2011, 33 pages.

\* cited by examiner

OPTIMIZING POWER FACTOR CORRECTION BETWEEN VOLTAGE REGULATORS

CROSS REFERENCE TO RELATED APPLICATIONS

The present application is a divisional application of and claims priority under 35 U.S.C. § 121 to U.S. Non-Provisional patent application Ser. No. 13/782,962, titled "Managed Multi-Phase Operation," and filed Mar. 1, 2013, which claims priority to U.S. Provisional Patent Application No. 61/605,643 titled "Managed Multi-Phase Operation" and filed Mar. 1, 2012. The entire contents of the foregoing applications are incorporated herein by reference.

TECHNICAL FIELD

The present disclosure relates generally to managed multi-phase voltage regulation and control in a multi-phase power system with a single phase control and to systems, methods, and devices for managed multi-phase voltage regulation and control with a single phase control.

BACKGROUND

Multi-phase power systems, which carry two or more alternating currents, are a common form of power distribution. The AC lines of a multi-phase power system typically have a phase offset from the others. This allows multi-phase systems to transmit more power compared to single phase power systems. A typical example of a multi-phase system is a three-phase electric power system. In a multi-phase system, a voltage regulator controller is used to maintain local operational control of the multiple connected single phase mechanisms that make up the multi-phase system. The voltage regulator controller may be communicatively coupled to a voltage regulator, which comprises a tap changer. The tap changer is capable of changing a tap position of the voltage regulator, providing variable/stepped voltage output regulation associated with a respective phase. Current multi-phase control methodology typically comprises a single mechanism for controlling multiple phases, or a lock-step group of mechanisms to regulate the multiple phases. In certain circumstances, such as in the presence of non-uniformly balanced loads, such control methodology may exacerbate system imbalance.

SUMMARY

In an example embodiment of the present disclosure, a method for maximum deviation multi-phase operation comprises setting a low boundary value of a maximum deviation window based on a first highest tap position of a plurality of tap changers, setting a high boundary value of the maximum deviation window based on a first lowest tap position of the plurality of tap changers, and independently regulating, by a plurality of voltage regulator controllers, a respective plurality of voltages of a respective plurality of voltage regulators based on the tap positions of the plurality of tap changers.

In another example embodiment of the present disclosure, a system for maximum deviation multi-phase operation comprises a plurality of voltage regulators, a plurality of tap changers, in which each of the plurality of tap changers is configured to change a tap position of one of the plurality of voltage regulators, and a plurality of voltage regulator controllers is configured to set tap positions of the plurality of tap changers. The system further comprises a controller coupled to at least one of the plurality of voltage regulator controllers. The controller is configured to set a low boundary value of a maximum deviation window based on a first highest tap position of the plurality of tap changers, and set a high boundary value of the maximum deviation window based on a first lowest tap position of the plurality of tap changers. The plurality of voltage regulator controllers are configured to regulate a respective plurality of voltages of the plurality of voltage regulators based on the tap positions of the plurality of tap changers.

In another example embodiment of the present disclosure, a method of optimized power factor correction comprises comparing a difference in measured power factors between two voltage regulators with a predetermined maximum difference, and when the difference is determined to be greater than the maximum difference, storing the difference as a previous difference in measured power factors. The method further comprises adjusting, by a controller, a tap position of one of the voltage regulators, comparing a second difference in measured power factors between the two voltage regulators with the previous difference in measured power factors, and when the second difference in measured power factors is not less than the previous difference in measured power factors, returning, by the controller, the tap position of the one of the voltage regulators to a prior tap position.

In another example embodiment, a method of phase angle balancing includes calculating an initial first phase angle, an initial second phase angle, and an initial third phase angle. The initial first phase angle, the initial second phase angle, and the initial third phase angle form an initial phase balance condition. The method further includes determining which of the initial first phase angle, the initial second phase angle, and the initial third phase angle has the largest value, and adjusting an output voltage of a phase opposite the initial phase angle having largest value.

In another example embodiment, a method of voltage delta balancing includes calculating an initial first voltage delta, an initial second voltage delta, and an initial third voltage delta. The initial first voltage delta, the initial second voltage delta, and the initial third voltage delta form an initial voltage balance condition. The method further includes determining which of the initial first voltage delta, the initial second voltage delta, and the initial third voltage delta has the largest value, and adjusting an output voltage of a phase opposite the initial voltage delta having largest value.

BRIEF DESCRIPTION OF THE DRAWINGS

For a more complete understanding of the invention and the advantages thereof, reference is now made to the following description, in conjunction with the accompanying figures briefly described as follows.

Figure 1:
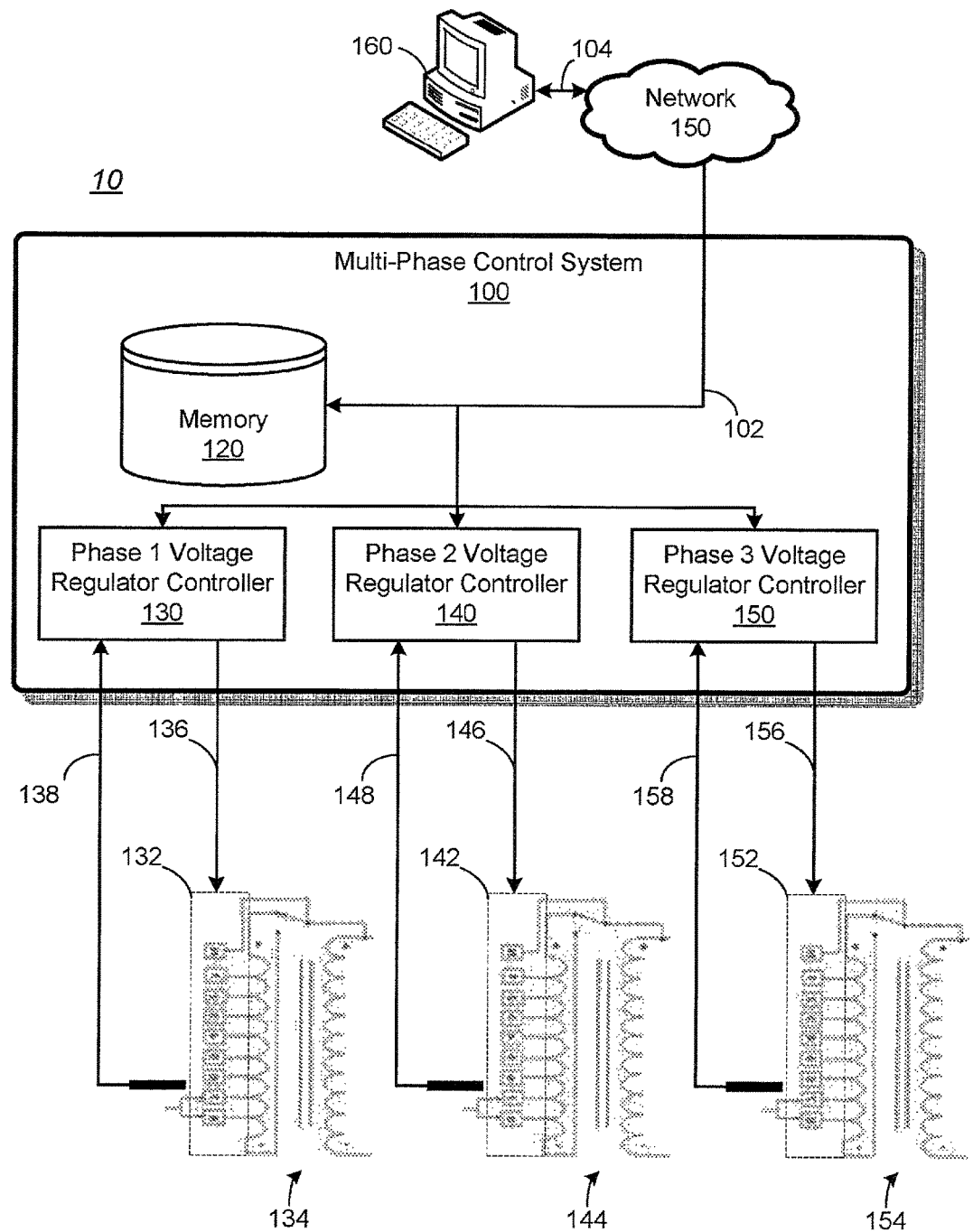
FIG. 1 illustrates a diagrammatic representation of a system for maximum deviation multi-phase operation, in accordance with an example embodiment of the present disclosure.

The drawings illustrate only example embodiments of the invention and are therefore not to be considered limiting of its scope, as the invention may admit to other equally effective embodiments. The elements and features shown in the drawings are not necessarily to scale, emphasis instead being placed upon clearly illustrating the principles of example embodiments of the present invention. Additionally, certain dimensions may be exaggerated to help visually convey such principles.

DETAILED DESCRIPTION OF EXAMPLE EMBODIMENTS

In the following paragraphs, the present invention will be described in further detail by way of example with reference to the attached drawings. In the description, well known components, methods, and/or processing techniques are omitted or briefly described so as not to obscure the invention. As used herein, the "present invention" refers to any one of the embodiments of the invention described herein and any equivalents. Furthermore, reference to various feature(s) of the "present invention" is not to suggest that all embodiments must comprise the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

With regard to the process flow diagrams of FIGS. 2-4 and 6, it is noted that the present invention may be practiced using an alternative order of the steps illustrated in FIGS. 2-4 and 6. That is, the process flows illustrated in FIGS. 2-4 and 6 are provided as examples only, and the present invention may be practiced using process flows that differ from those illustrated. Additionally, it is noted that not all steps are required in every embodiment. In other words, one or more of the steps may be omitted or replaced, without departing from the spirit and scope of the invention. In alternative embodiments, steps may be performed in different orders, in parallel with one another, or omitted entirely, and/or certain additional steps may be performed without departing from the scope and spirit of the invention.

Turning now to the drawings, in which like numerals indicate like elements throughout, example embodiments of the invention are described in detail.

FIG. 1 illustrates an embodiment of a system 10 for maximum deviation multi-phase operation of a plurality of voltage regulators with a multi-phase controller. The system 10 comprises a multi-phase control system 100 and tap changers 132, 142, and 152, respectively, of voltage regulators 134, 144, and 154. The multi-phase control system 100 comprises a memory 120 and voltage regulator controllers 130, 140, and 150. Each of the voltage regulator controllers 130, 140, and 150 is configured to set a tap of a respective one of the tap changers 132, 142, and 152, as illustrated. It is noted that the voltage regulator controllers 130, 140, and 150 may be integrated together as part of a single controller or separate from each other. It is further noted that the memory 120 may reside, in part, within each of the voltage regulator controllers 130, 140, and 150, or as part of the single integrated controller including each of the voltage regulator controllers 130, 140, and 150.

In one embodiment, the voltage regulators 134, 144, and 154 each provide a line voltage for a respective phase of a 3-phase power delivery system. However, the system 10 may comprise fewer or more voltage regulators, tap changers, and voltage regulator controllers. Further, each of the tap changers 132, 142, and 152 comprises a plurality of taps by which a line voltage of one of the voltage regulators 134, 144, and 154 may be selected and each of the voltage regulators 134, 144, and 154 comprises a winding of a power transformer, as would be understood in the art. The number of taps available for selection by each of the tap changers 132, 142, and 152 may range from 32 to 64 taps, for example, without limitation. One of ordinary skill in the art would appreciate that the present invention may be embodied using various types of voltage regulators, various types of tap changers, and tap changers having any number of tap positions available for selection.

Each of the voltage regulator controllers 130, 140, and 150 receives a sense signal 138, 148, or 158 from a respective one of the windings of the respective voltage regulator 134, 144, and 154. Each sense signal comprises a voltage and/or current sense signal based on a current line output voltage and/or current of one of the windings of the respective voltage regulator 134, 144, and 154, according to a tap position set by one of the tap changers 132, 142, and 152, respectively. Each sense signal 138, 148, and 158 further comprises feedback which permits the voltage regulator controllers 130, 140, and 150 to determine the tap position of the tap changers 132, 142, and 152. Each of the tap changers is controlled by a control signal 136, 146, or 156 from one of the voltage regulator controllers 130, 140, or 150.

The voltage regulator controllers 130, 140, and 150 are communicatively coupled together via a communications link. In one embodiment, one of the voltage regulator controllers 130, 140, and 150, acts as a leader, receives feedback from the other voltage regulator controllers 130, 140, and 150, and coordinates the operation of the other voltage regulator controllers 130, 140, and 150, among other aspects. For example, as described in further detail below, the leader controller is configured to transmit a maximum deviation window comprising low and high tap position boundary values among the voltage regulator controllers 130, 140, and 150, and the voltage regulator controllers 130, 140, and 150 are configured to operate the tap positions of the tap changers 132, 142, and 152 within the maximum deviation window in one mode of operation. That is, in one mode of operation, the voltage regulator controllers 130, 140, and 150 are configured to set the taps of the tap changers 132, 142, and 152 within a permissible range of tap values defined by the maximum deviation window. The voltage regulator controllers 130, 140, and 150 are further configured to set the taps of the tap changers 132, 142, and 152 in view of the sense signals 138, 148, and 158 and the permissible range of tap values. Additionally, the voltage regulator controllers 130, 140, and 150 are configured to transmit information such as current tap position information to the leader controller, so that the leader controller may manage the operation of the other voltage regulator controllers 130, 140, and 150 in tandem.

The voltage regulator controllers 130, 140, and 150 are communicatively coupled to a network 150 via communications link 102. An administrative terminal 160 is also communicatively coupled to the network 150 via communications link 104. Using the communications links 102 and 104 and the network 150, the administrative terminal 160 is able to communicate with the voltage regulator controllers 130, 140, and 150. For example, the administrative computer 160 may be used to update parameters and settings of the voltage regulator controllers 130, 140, and 150 to manage the multi-phase operation of the voltage regulator controllers 130, 140, and 150.

In general, the multi-phase control system 100 is configured to set a low boundary value of a maximum deviation window based on a current highest tap position of the plurality of tap changers 132, 142, and 152 and a user-defined maximum deviation value, set a high boundary value of the maximum deviation window based on a current lowest tap position of the plurality of tap changers 132, 142, and 152 and the user-defined maximum deviation value, and independently regulate, by the plurality of voltage regulator controllers 130, 140, and 150, voltages of the plurality of voltage regulators 134, 144, and 154 based on the tap positions of the plurality of tap changers 132, 142, and 152. As described herein, the maximum deviation window comprises a range of acceptable tap positions for the plurality of tap changers 132, 142, and 152. In one mode of operation, multi-phase control system 100 communicates the maximum deviation window among the voltage regulator controllers 130, 140, and 150, and the voltage regulator controllers 130, 140, and 150 independently regulate the voltages of the voltage regulators 134, 144, and 154 (via the tap changers), respectively, within the permissible tap positions defined by the maximum deviation window. For example, a leader controller of the voltage regulator controllers 130, 140, and 150 may communicate the maximum deviation window among the controllers.

As described in further detail below, the maximum deviation window, MaxDevWin, comprises an array of high and low boundary values, {Low, High}. The high and low boundary values represent high and low boundaries of tap positions of tap changers, when in a maximum deviation multi-phase mode of operation. The multi-phase control system 100 may set the high and low boundaries of the maximum deviation window with reference to the user-defined maximum deviation value, MaxDevU, which may be defined by an administrator using the administrative terminal 160, for example. At the outset of the maximum deviation mode of operation, the multi-phase control system 100 may also set the high and low boundaries of the maximum deviation window with reference to the highest and lowest current tap positions of the voltage regulators being managed, as described in further detail below.

In one aspect, the multi-phase control system 100 is configured to set both the low and high boundary values of the maximum deviation window to an average of the highest and the lowest current tap positions of the plurality of tap changers, based on certain initial conditions of the system 10. The multi-phase control system 100 is further configured to set both the low boundary value and the high boundary value to an average of the highest and the lowest current tap positions of the plurality of tap changers 132, 142, and 152, based on other initial conditions of the system 10.

In other aspects, the multi-phase control system 100 is further configured to determine whether a difference between tap positions of first and second of the plurality of tap changers 132, 142, and 152 and a difference between tap positions of second and third of the plurality of tap changers 132, 142, and 152 are each equal to or greater than the user-defined maximum deviation value, and decrement each of the high and low boundary values of the maximum deviation window when it is determined that the differences are each equal to or greater than the user-defined maximum deviation value, positions of two of the plurality of tap changers 132, 142, and 152 are set to the low boundary value, and line voltages output by voltage regulators associated with the two of the plurality of tap changers are above a set voltage band. The multi-phase control system 100 is further configured to determine whether a difference between tap positions of first and second of the plurality of tap changers 132, 142, and 152 and a difference between tap positions of second and third of the plurality of tap changers 132, 142, and 152 are each equal to or greater than the user-defined maximum deviation value, and increment each of the high and low boundary values of the maximum deviation window when it is determined that the differences are each equal to or greater than the user-defined maximum deviation value, positions of two of the plurality of tap changers are set to the high boundary value, and line voltages output by voltage regulators associated with the two of the plurality of tap changers are below the set voltage band.

Figure 2:
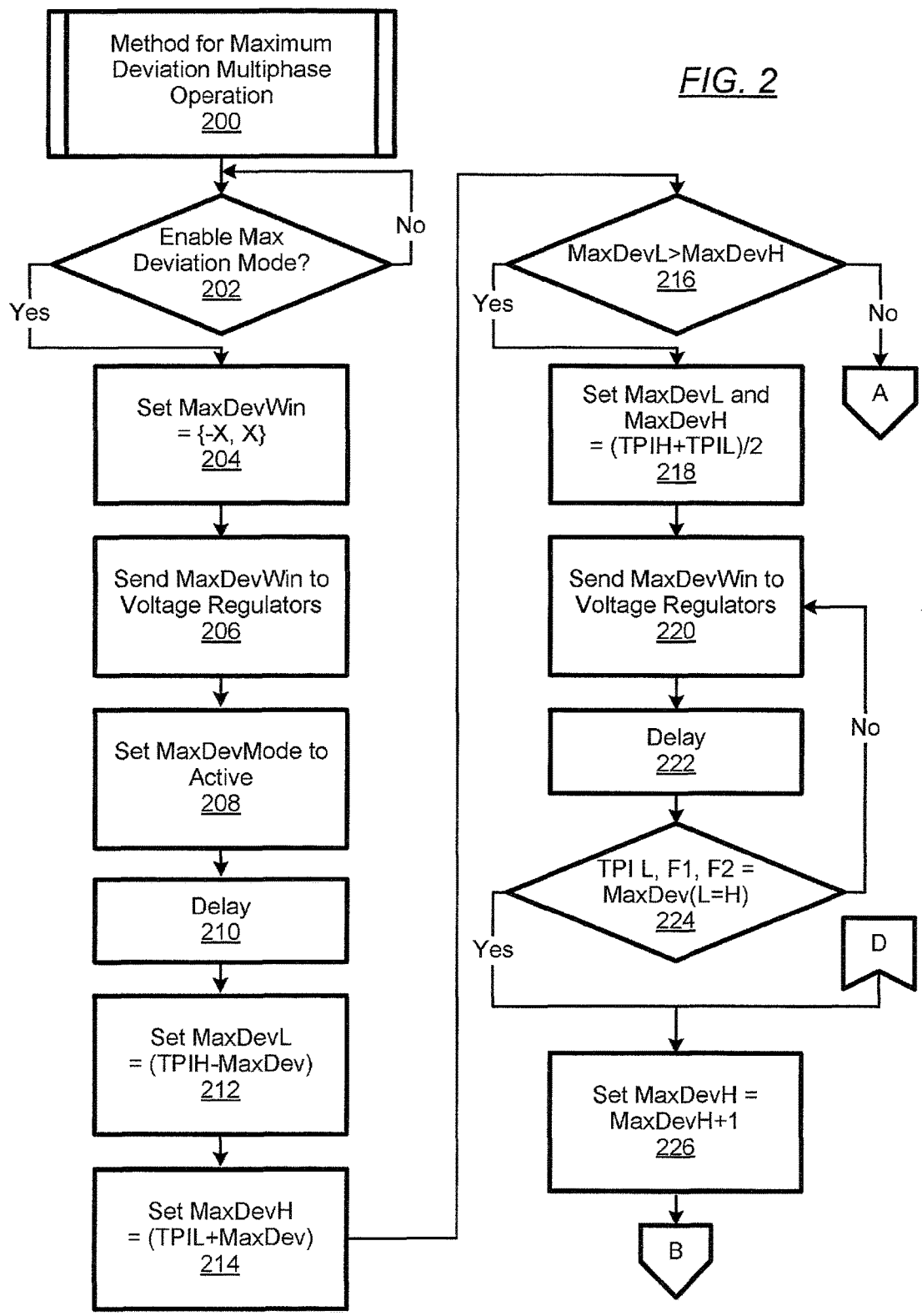
FIG. 2 illustrates a flow chart of a first portion of a method for maximum deviation multi-phase operation, in accordance with an example embodiment of the present disclosure.

Turning to FIG. 2, a method for maximum deviation multi-phase operation 200 is described. At step 202, the multi-phase control system 100 determines whether multi-phase maximum deviation mode is to be enabled. With reference to the system 10, the determination may be made based on the current status of the system 10, the current status or settings of each of the voltage regulator controllers, and commands or parameters received from the administrative terminal 160, for example. When the multi-phase control system 100 determines that the conditions are set to enable maximum deviation multi-phase maximum deviation mode, the process proceeds to step 204. At step 204, the low and high boundary values of the maximum deviation window, MaxDevWin, are set by the multi-phase control system 100. In one embodiment, the low and high values are set to −16 and 16, respectively, but other initial values are within the scope of the disclosure. At step 206, MaxDevWin is communicated among the plurality of voltage regulator controllers 130, 140, and 150, and, at step 208, each of the voltage regulator controllers 130, 140, and 150 are set to activate maximum deviation multi-phase mode.

After entering maximum deviation multi-phase mode at step 208, a delay occurs at step 210. The delay may be set by the multi-phase control system 100 to allow any tap changes by the tap changers 132, 142, and 152 to occur, as instructed by the voltage regulator controllers 130, 140, and 150 after activation of maximum deviation multi-phase mode. Among embodiments, the amount of time for the delay at step 210 may vary depending upon design considerations. At step 212, the multi-phase control system 100 sets the low boundary value of MaxDevWin, MaxDevL, to the current highest tap position, TPIH, among the tap changers 132, 142, and 152 minus the user-defined maximum deviation value MaxDevU. Further, at step 214, the multi-phase control system 100 sets the high boundary value of MaxDevWin, MaxDevH, to the current lowest tap position, TPIL, among the tap changers 132, 142, and 152 plus the user-defined maximum deviation value MaxDevU.

At step 216, the multi-phase control system 100 determines whether the value of MaxDevL>MaxDevH. If MaxDevL is determined to be greater than MaxDevH at step 216, the process proceeds to step 218 where both MaxDevL and MaxDevH are set by the multi-phase control system 100 to an average of the highest and lowest tap positions of the of the tap changers 132, 142, and 152 when activating maximum deviation multi-phase mode. At step 220, the multi-phase control system 100 sends MaxDevWin among the voltage regulators 130, 140, and 150 and a delay in the process occurs at step 222. After the delay at step 222, the multi-phase control system 100 determines whether each of the tap changers 132, 142, and 152 have settled to the tap defined by the average of the highest and lowest tap positions according to the direction of the voltage regulator controllers 130, 140, and 150 at step 224. If the tap changers have not settled, the process returns to step 220 and MaxDevWin is communicated among the voltage regulator controllers 130, 140, and 150, and the process delays at step 222.

Figure 3:
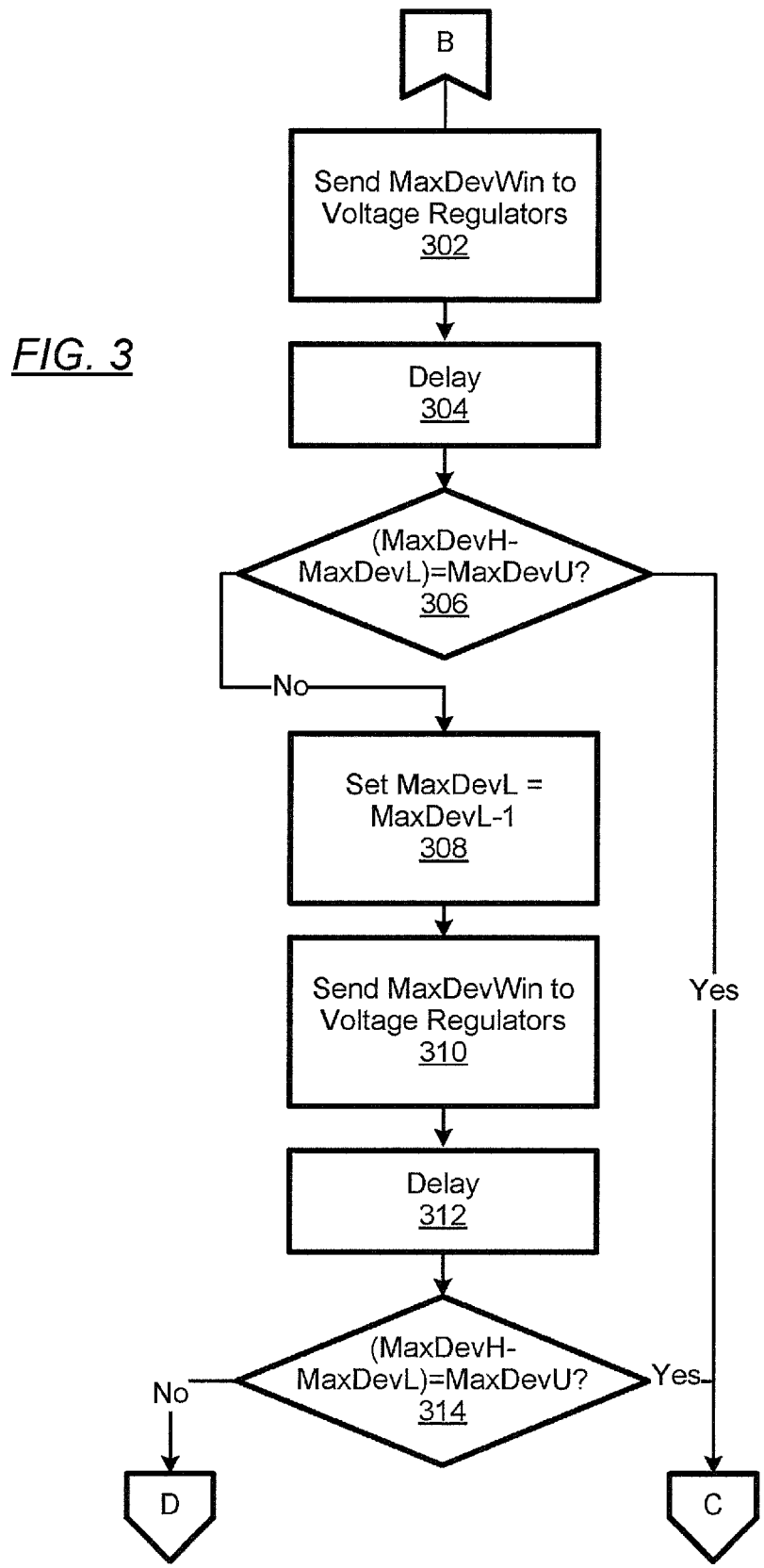
FIG. 3 further illustrates a flow chart of a second portion of the method for maximum deviation multi-phase operation, in accordance with an example embodiment of the present disclosure.

On the other hand, if the tap changers 132, 142, and 152 have each settled to the tap defined by the average of the highest and lowest tap positions when activating maximum deviation multi-phase mode, the process proceeds to step 226. At step 226, the multi-phase control system 100 increments MaxDevH by one. With reference to FIG. 3, after step 226, the MaxDevWin (with the updated value of MaxDevH) is communicated among the voltage regulator controllers 130, 140, and 150 at step 302, and the process delays at step 304. At step 306, the multi-phase control system 100 determines whether the difference between MaxDevH and MaxDevL is equal to the MaxDevU. If not, the process proceeds to step 308, where the multi-phase control system 100 decrements MaxDevL by 1, MaxDevWin is communicated among the voltage regulator controllers 130, 140, and 150 at step 310, and the process delays at step 312. At step 314, the multi-phase control system 100 again determines whether the difference between MaxDevH and MaxDevL is equal to the MaxDevU and, if not, proceeds back to step 226 to increment MaxDevH by one.

It is noted that, at steps 218, 220, 222, 224, 226, 302, 304, 306, 308, 310, 312, and 314, the multi-phase control system 100 first collapses and then re-opens the window of available tap positions defined by MaxDevWin, in response to an "error" condition being determined at step 216. Particularly, if MaxDevL is determined to be greater than MaxDevH at step 216, the multi-phase control system 100 first collapses the window of available tap positions at step 218, waits for the voltage regulator controllers 130, 140, and 150 to set each tap position of the tap changers 132, 142, and 152 to the same tap position at steps 220, 222, and 224, and then gradually re-opens the window of available tap positions at steps 226, 302, 304, 306, 308, 310, 312, and 314.

Figure 4:
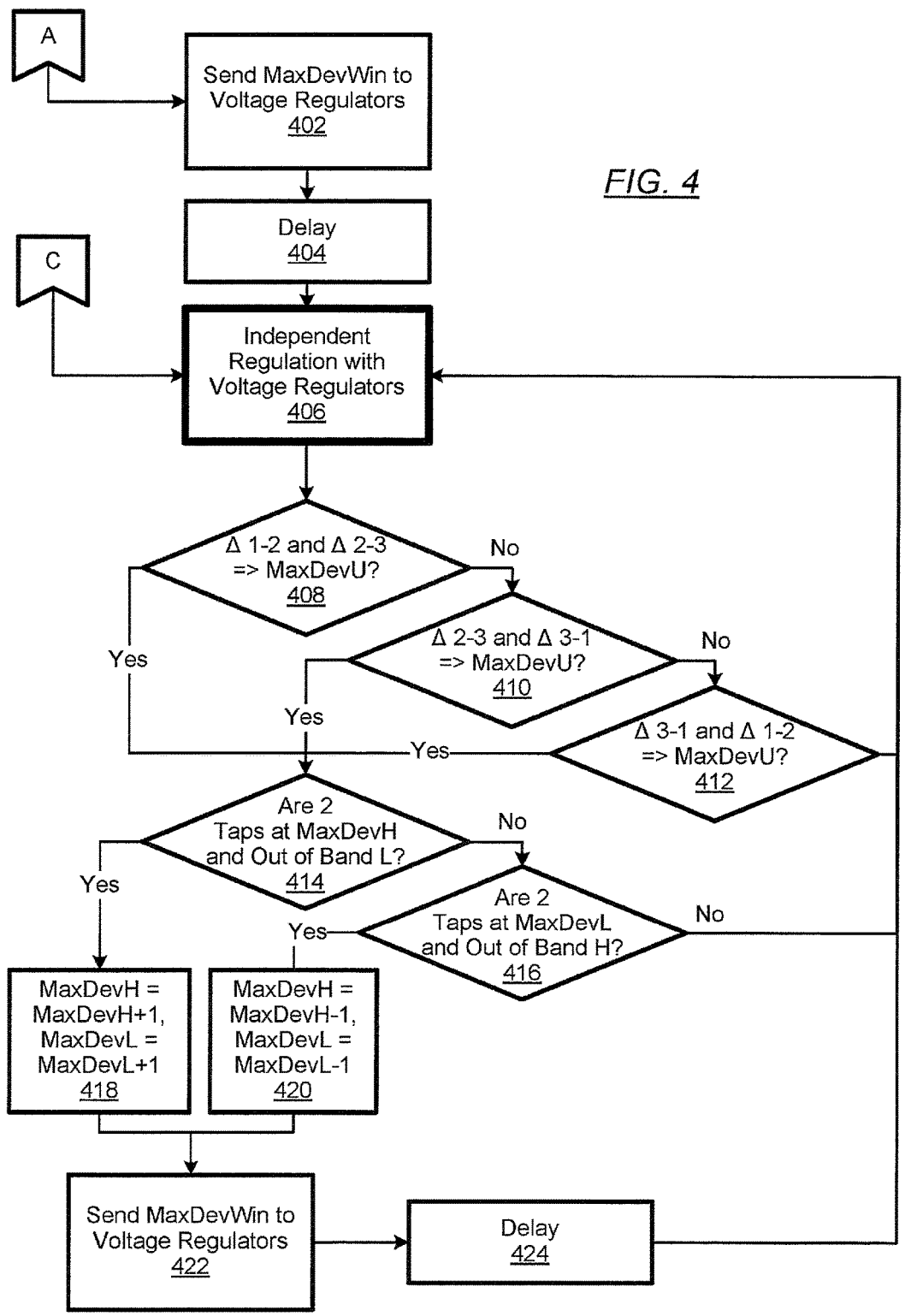
FIG. 4 further illustrates a flow chart of a third portion of the method for maximum deviation multi-phase operation, in accordance with an example embodiment of the present disclosure.

If, at step 216, the multi-phase control system 100 determines that MaxDevL is less than MaxDevH, the process proceeds to step 402, illustrated at FIG. 4. At step 402, MaxDevWin is communicated among the voltage regulator controllers 130, 140, and 150 and the process delays at step 404. After the delay at step 404, the multi-phase control system 100 permits independent regulation of the voltage regulators 134, 144, and 154 by the voltage regulator controllers 130, 140, and 150. Particularly, at step 406, the voltage regulator controllers 130, 140, and 150 voltage-regulate the line voltage output of each of the voltage regulators 134, 144, and 154 using the tap changers 132, 142, and 152. The voltage regulator controllers 130, 140, and 150 may voltage-regulate the line voltage of the voltage regulators 134, 144, and 154 based on the voltage, current, and tap position sense feedback signals 138, 148, and 158.

At steps 408, 410, and 412, the multi-phase control system 100 determines whether the difference between the tap positions of any two of the tap changers 132, 142, and 152 is equal to or greater than the MaxDevU. If not, the process proceeds back to step 406, where independent voltage regulation continues. On the other hand, if the multi-phase control system 100 determines at steps 408, 410, and 412 that the difference between the tap positions of any two of the tap changers 132, 142, and 152 is equal to or greater than the MaxDevU, the process proceeds to step 414. At step 414, the multi-phase control system 100 determines whether positions of two of the tap changers 132, 142, and 152 are set to the high boundary value MaxDevH and line voltages output by voltage regulators associated with the two of the plurality of tap changers are below a set voltage band. If multi-phase control system 100 determines that the conditions at step 414 are true, the process proceeds to step 418, where both MaxDevH and MaxDevL are incremented by one.

Alternatively, if the multi-phase control system 100 determines that the conditions at step 416 are false, the process proceeds to step 420, where the multi-phase control system 100 determines whether positions of two of the tap changers 132, 142, and 152 are set to the low boundary value MaxDevL and line voltages output by voltage regulators associated with the two of the plurality of tap changers are above the set voltage band. If the multi-phase control system 100 determines that the conditions at step 416 are true, the process proceeds to step 420, where both MaxDevH and MaxDevL are decremented by one. After steps 418 or 420, the process proceeds to step 422, where MaxDevWin is communicated among the voltage regulator controllers 130, 140, and 150 and delays at step 424. After the delay at step 424, the process proceeds back to step 406, where independent voltage regulation continues.

In another embodiment, the multi-phase control system 100 may be further configured to operate the voltage regulator controllers 130, 140, and 150 in various modes of operation. For example, the multi-phase control system 100 may control the voltage regulator controllers 130, 140, and 150 in a type of enhanced leader/follower mode where historical tap positions are recorded over time. That is, the multi-phase control system 100 may track the respective tap positions of the tap changers 132, 142, and 152 by time of day or day of week, for example, and store this information in the memory 120. When attempting to address a system variation or troubleshoot system fluctuations, the multi-phase control system 100 may refer to the historical tap position information stored in the memory 120 to set taps of the voltage regulators 134, 144, and 154 based on previous tap position(s) based on time of day or week, for example. Based on this operation, if a loss of neutral wire is detected, a tap changer may be set to a tap position based on a historical tap position during or after repair. Historical tap position data may be stored in the memory 120 in thirty minute increments, for example, without limitation. The multi-phase control system 100 may also calculate a running average of tap positions over hours, days, or weeks of operation.

In another embodiment, the multi-phase control system 100 may operate in a mode of operation to average the line voltage of the voltage regulators 134, 144, and 154 within an allowable deviation. Should a difference in tap position between any regulators be within a defined allowable deviation, the multi-phase control system 100 may regulate to an average system voltage without exceeding the allowable deviation. The multi-phase control system 100 may be further configured to operate within any mode of operation described herein during a user-defined time period maintained by a timer.

In other aspects, the multi-phase control system 100 may permit one of the following additional modes of operation after expiration of a timed mode of operation: tap to neutral mode, ganged operation mode, regulate to historical tap position mode. Tap to neutral mode may be defined by the multi-phase control system 100 directing each of the tap changers 132, 142, and 152 to tap to neutral upon expiration of the timed mode of operation. Ganged operation mode may be defined by the multi-phase control system 100 locking all voltage regulators 134, 144, and 154 in ganged mode (lock-step operation) based on an average voltage calculation of a leader regulator upon expiration of the timed mode of operation. The regulate to historical tap position mode may be defined by the multi-phase control system 100 to regulate to historical tap position data which was previously stored in the memory 120, as described above, upon expiration of the timed mode of operation.

Deactivation of any of the modes described herein may be achieved by user selectable options at either a control panel of one of the voltage regulator controllers 130, 140, and 150 or the administrative terminal 160. Should one mode be deactivated, the voltage regulator controllers 130, 140, and 150 may resume normal regulation or resume regulation based another predefined mode.

Figure 5:
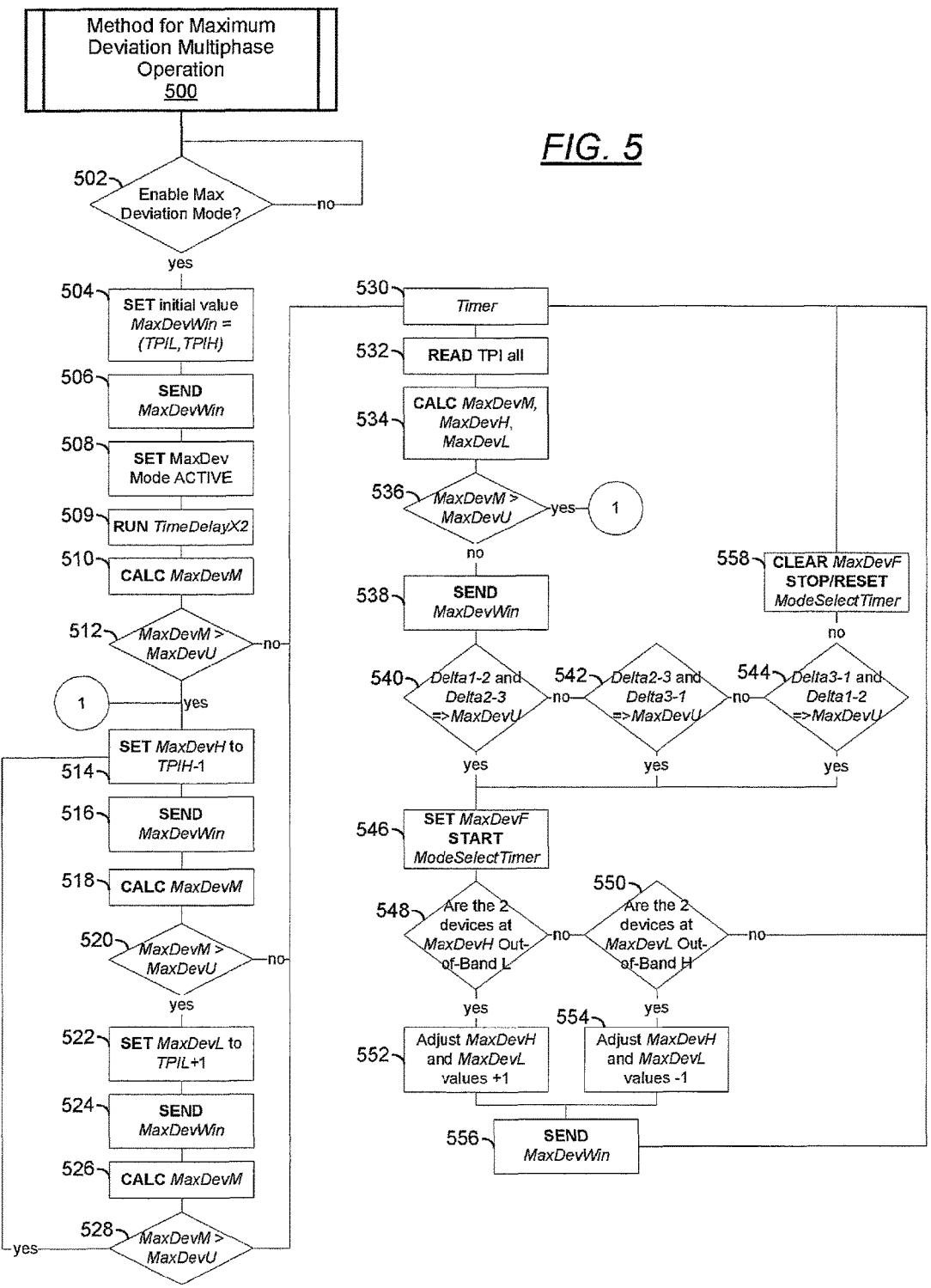
FIG. 5 illustrates a flow chart of another example embodiment of a method for maximum deviation multi-phase operation, in accordance with an example embodiment of the present disclosure.

Turning to FIG. 5, another embodiment of a method for maximum deviation multi-phase operation, 500, is described. At step 502, the multi-phase controller 100 determines whether multi-phase maximum deviation mode is to be enabled. With reference to the system 10, the determination may be made based on the current status of the system 10, the current status or settings of each of the voltage regulator controllers 130, 140, and 150, and commands or parameters received from the administrative terminal 160, for example. When the multi-phase controller 100 determines that the conditions are set to enable maximum deviation multi-phase maximum deviation mode, the process proceeds to step 504. At step 504, the low and high boundary values of the maximum deviation window, MaxDevWin, are set to the values of TPIL and TPIH, respectively. That is, at step 504, the multi-phase control system 100 sets the low boundary value of MaxDevWin, MaxDevL, to the current lowest tap position, TPIL, among the tap changers 132, 142, and 152 and sets the high boundary value of MaxDevWin, MaxDevH, to the current highest tap position, TPIH, among the tap changers 132, 142, and 152. At step 506, MaxDevWin is communicated among the plurality of voltage regulator controllers 130, 140, and 150, and, at step 508, each of the voltage regulator controllers 130, 140, and 150 are set to activate maximum deviation multi-phase mode.

After entering maximum deviation multi-phase mode at step 508, a delay occurs at step 509. The delay may be set by the multi-phase control system 100 to allow any tap changes by the tap changers 132, 142, and 152 to occur, as instructed by the voltage regulator controllers 130, 140, and 150 after activation of maximum deviation multi-phase mode. Among embodiments, the amount of time for the delay at step 509 may vary depending upon design considerations. At step 510, the multi-phase control system 100 calculates the value of MaxDevM, defined as TPIH-TPIL. Specifically, the value of MaxDevM is equal to the value of the current highest tap position, TPIH, among the tap changers 132, 142, and 152 minus the value of the current lowest tap position, TPIL, among the tap changers 132, 142, and 152.

At step 512, the multi-phase control system 100 determines whether the value of MaxDevM is greater than the user-defined maximum deviation value MaxDevU. If MaxDevM is determined to be greater than MaxDevU at step 512, the process proceeds to step 514 where the multi-phase control system 100 sets the high boundary value of MaxDevWin, MaxDevH, to TPIH−1. After step 514, the process proceeds to step 516, where MaxDevWin is communicated among the plurality of voltage regulator controllers 130, 140, and 150. At step 518, the multi-phase control system 100 again calculates the value of MaxDevM and, at step 520, the multi-phase control system 100 again determines whether the value of MaxDevM is greater than the user-defined maximum deviation value MaxDevU. If the value of MaxDevM is still greater than the user-defined maximum deviation value MaxDevU at step 520, the process proceeds to step 522, where the multi-phase control system 100 sets the low boundary value of MaxDevWin, MaxDevL, to TPIL+1.

After step 522, the process proceeds to step 524, where MaxDevWin is communicated among the plurality of voltage regulator controllers 130, 140, and 150. At step 526, the multi-phase control system 100 again calculates the value of MaxDevM and, at step 528, the multi-phase control system 100 again determines whether the value of MaxDevM is greater than the user-defined maximum deviation value MaxDevU. If the value of MaxDevM is still greater than the user-defined maximum deviation value MaxDevU at step 528, the process proceeds back to step 514, where the multi-phase control system 100 reduces the current high boundary value of MaxDevWin, MaxDevH, by 1.

It is noted that steps 510, 512, 514, 516, 518, 520, 522, 524, 526, and 528 seek to slowly bring the difference between the current highest TPIH and lowest TPIL tap positions among the tap changers 132, 142, and 152, MaxDevM, within the range defined by the user-defined maximum deviation value, MaxDevU. Especially when first activating maximum deviation multi-phase mode, the value of MaxDevM may be greater than the value of MaxDevU. In the method 500, this condition is identified at steps 512, 520, and 528 (and later at step 536). It is again noted that, after activating maximum deviation multi-phase mode at step 508, each voltage regulator controllers 130, 140, and 150 controls and maintains the tap position of its respective tap changer 132, 142, and 152 to be within the positions defined by the maximum deviation window MaxDevWin. Initially, because the maximum deviation window MaxDevWin is set to the current highest TPIH and lowest TPIL tap positions among the tap changers 132, 142, and 152 at step 504, the voltage regulator controllers 130, 140, and 150 do not need to change tap positions. However, as the upper and lower boundaries MaxDevH and MaxDevL of the maximum deviation window MaxDevWin are incrementally confined at steps 514 and 522, the voltage regulator controllers 130, 140, and 150 may change tap positions, as necessary, to bring the tap positions of the tap changers 132, 142, and 152 within the range of permissible tap positions defined by MaxDevWin. In turn, the difference between the current highest TPIH and lowest TPIL tap positions among the tap changers 132, 142, and 152, MaxDevM, will reduce. In this manner, the value of MaxDevM will eventually converge to be equal to or less than value of the user-defined maximum deviation value MaxDevU.

If the value of MaxDevM is determined to be equal to or less than the user-defined maximum deviation value MaxDevU at steps 512, 520, or 528, the process proceeds to step 530, where a settling delay occurs at step 530. The delay at step 530 is configurable to be the same as or different than the delay at step 509. At step 532, the multi-phase control system 100 reads the current tap position of each of the tap changers 132, 142, and 152 and, at step 534, the values of MaxDevM, MaxDevH, and MaxDevL are calculated, retrieved, or determined. At step 536, the multi-phase control system 100 determines whether the value of MaxDevM is greater than the user-defined maximum deviation value MaxDevU. If the value of MaxDevM is determined to be greater than the user-defined maximum deviation value MaxDevU at step 536, the process proceeds to step 514, as illustrated. Alternatively, if the value of MaxDevM is determined to be equal to or less than the user-defined maximum deviation value MaxDevU at step 536, the process proceeds to step 538 where MaxDevWin is communicated among the plurality of voltage regulator controllers 130, 140, and 150. Generally, step 538 may be considered to comprise a steady state where independent voltage regulation continues by the voltage regulator controllers 130, 140, and 150.

At steps 540, 542, and 544, the multi-phase control system 100 determines whether the difference between the tap positions of any two of the tap changers 132, 142, and 152 is equal to or greater than the MaxDevU. If the multi-phase control system 100 determines at any of steps 540, 542, and 544 that the difference between the tap positions of any two of the tap changers 132, 142, and 152 is equal to or greater than MaxDevU, the process proceeds to step 546. At step 546, the multi-phase control system 100 sets the MaxDevF flag, indicating that tap positions of the tap changers 132, 142, and 152 are set at the limits defined by the user-defined maximum deviation value MaxDevU. The multi-phase control system 100 also starts a timer, ModeSelectTimer, at step 546. The process defined by the method 500 will exit to another predefined routine if the timer ModeSelectTimer expires or overflows and, generally, the timer ModeSelectTimer runs while the MaxDevF flag is set. The timer ModeSelectTimer may count up or down and may be set to run for a predetermined and configurable amount of time until directing an interrupt of the method 500, for example. In this manner, the timer ModeSelectTimer will cause the process defined by the method 500 to interrupt or end if the tap positions of the tap changers 132, 142, and 152 are set at the limits defined by the user-defined maximum deviation value MaxDevU for an extended predetermined and configurable period of time.

If the multi-phase control system 100 determines at steps 540, 542, and 544 that no difference between the tap positions of any two of the tap changers 132, 142, and 152 is equal to or greater than the MaxDevU, the process proceeds to step 558. At step 558, the multi-phase control system 100 clears the MaxDevF flag and stops or resets the timer ModeSelectTimer, and the process proceeds to step 530. Thus, if the multi-phase control system 100 determines at steps 540, 542, and 544 that no difference between the tap positions of any two of the tap changers 132, 142, and 152 is equal to or greater than the MaxDevU, generally, independent voltage regulation by the voltage regulator controllers 130, 140, and 150 continues.

At step 548, the multi-phase control system 100 determines whether positions of two of the tap changers 132, 142, and 152 are set to the high boundary value MaxDevH and line voltages output by voltage regulators associated with the two of the plurality of tap changers are below a set voltage band. If multi-phase control system 100 determines that the conditions at step 548 are true, the process proceeds to step 552, where both MaxDevH and MaxDevL are incremented by one. Alternatively, if the multi-phase control system 100 determines that the conditions at step 548 are false, the process proceeds to step 550, where the multi-phase control system 100 determines whether positions of two of the tap changers 132, 142, and 152 are set to the low boundary value MaxDevL and line voltages output by voltage regulators associated with the two of the plurality of tap changers are above the set voltage band. If the multi-phase control system 100 determines that the conditions at step 550 are false, the process returns to step 530. Alternatively, if the multi-phase control system 100 determines that the conditions at step 550 are true, the process proceeds to step 554, where both MaxDevH and MaxDevL are decremented by one. After steps 552 or 554, the process proceeds to step 556, where MaxDevWin is communicated among the voltage regulator controllers 130, 140, and 150 and the process proceeds to step 530 for continued independent voltage regulation by the voltage regulator controllers 130, 140, and 150.

Figure 6:
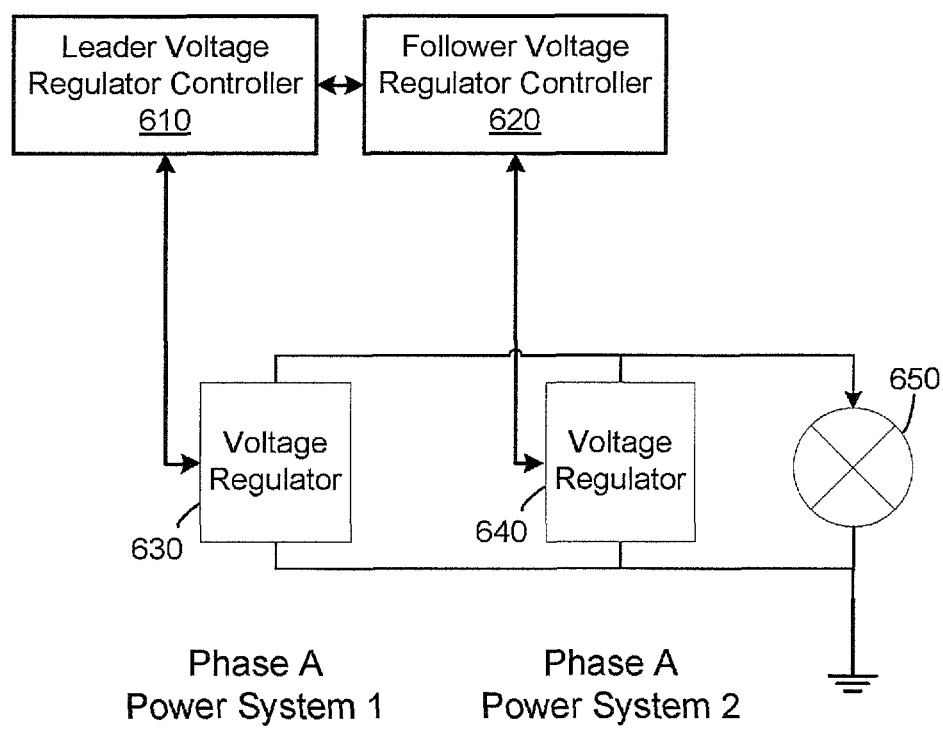
FIG. 6 illustrates a diagrammatic representation of a system for optimized power factor correction, in accordance with an example embodiment of the present disclosure.

Turning to FIG. 6, a system 60 for optimized power factor correction is described. The system 60 comprises a leader voltage regulator controller 610, a follower voltage regulator controller 620, a voltage regulator 630 of phase A of a first power system, a voltage regulator 640 of phase A of a second power system, and a load 650. FIG. 6 illustrates a parallel connection among common phases "A" of two separate multi-phase power delivery systems. In FIG. 6, line outputs from common phases of two different power systems are coupled or connected in parallel to drive the load 650. In this configuration, the load 650 is supplied with power from phase A of both the first and second power systems, which may be necessary in cases where load 650 demands a large amount of power. The voltage regulators 630 and 640 are similar to the voltage regulators described with reference to FIG. 1. Each voltage regulator 630 and 640 regulates a line voltage of phase A of a respective multi-phase power system.

The leader and follower voltage regulator controllers 610 and 620 are configured to regulate line output voltages of phase A of the first and second power systems, respectively, using the first and second voltage regulators 630 and 640. The leader and follower voltage regulator controllers 610 and 620 may regulate the output voltages by changing taps of tap changers of the first and second voltage regulators 630 and 640, as necessary, based on voltage and/or current sense feedback signals. In the configuration illustrated in FIG. 6, the leader and follower voltage regulator controllers 610 and 620 are communicatively coupled and the leader voltage regulator controller 610 directs the follower voltage regulator controller 620. For example, the leader voltage regulator controller 610 may be programmed with a voltage to be regulated for the load 650 and coordinate the voltage control of the follower voltage regulator controller 620 accordingly.

Because the line outputs from the voltage regulators 630 and 640 are coupled together to drive the load 650 as illustrated in FIG. 6, circulating current may flow between the voltage regulators 630 and 640 if an imbalance exists between them. The imbalance may exist due to differences in properties of the respective voltage regulators 630 and 640, such as impedance mismatches. This imbalance may be identified by the voltage regulator controllers 610 and 620, at least in part, by a measure of the difference in power factors of power delivered by each of the voltage regulators 630 and 640. Thus, the leader and follower voltage regulator controllers 610 and 620 are configured to measure the power factors of power delivered by each of the voltage regulators 630 and 640 using voltage and current sense signals provided by the voltage regulators 630 and 640. As understood in the art, power factor is defined as the ratio between the real power delivered and the absolute value of complex power delivered. Ideally, the power factor for power delivered by each of the voltage regulators 630 and 640 would be 1.

When the power factor of the first voltage regulator 630 is different than the power factor of the second voltage regulator 640, circulating current will flow between the two regulators, which causes energy loss and, perhaps, system damage. One way to correct the difference in power factor is by changing tap positions of tap changers of the voltage regulator controllers 630 and 640.

Figure 7:
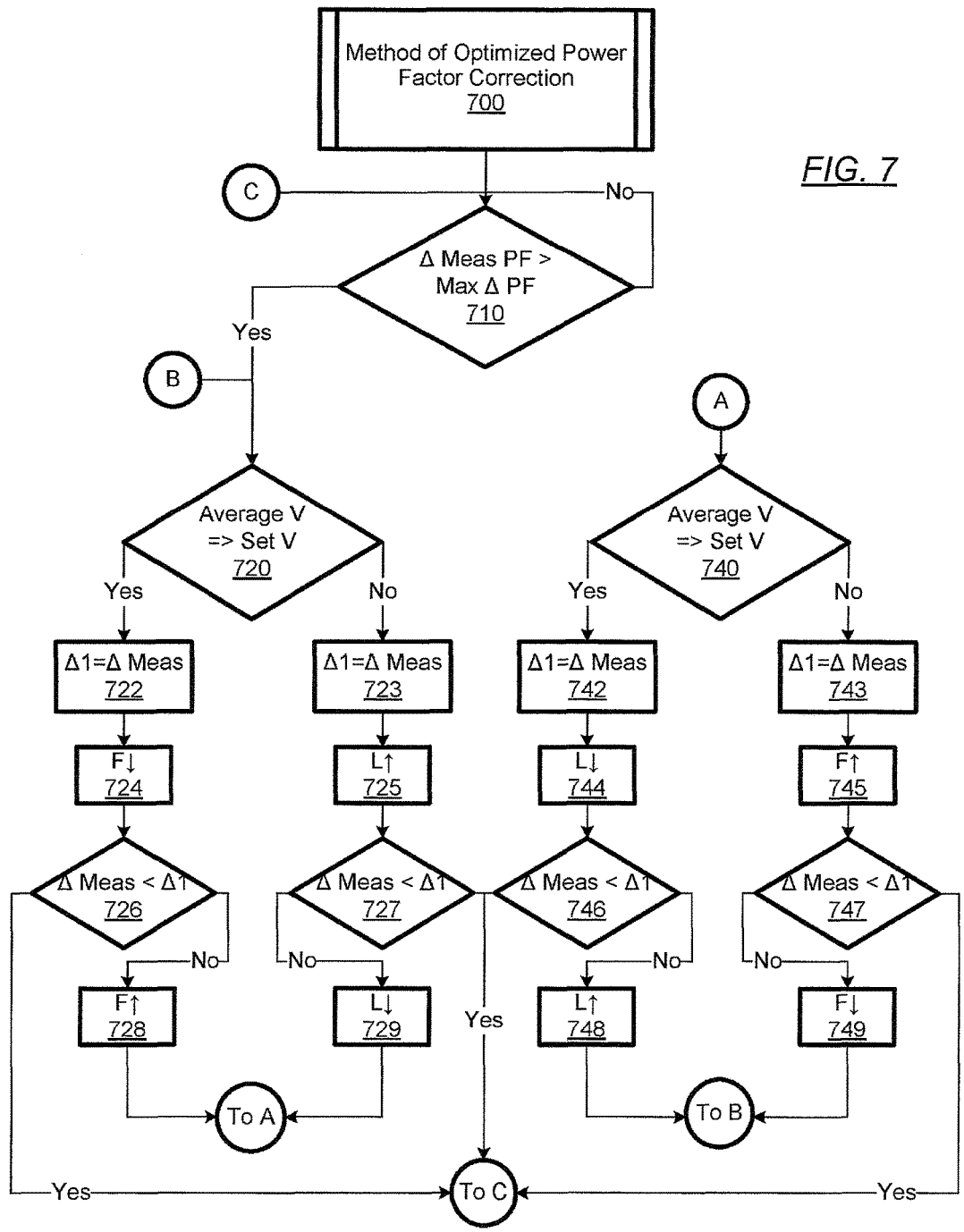
FIG. 7 illustrates a flow chart of a method for optimized power factor correction, in accordance with an example embodiment of the present disclosure.

In this context, a method 700 of optimized power factor correction is described with reference to FIG. 7. At the outset, it is noted that the steps of the method 700 may be performed by the leader voltage regulator controller 610, the follower voltage regulator controller 620, or a combination of the leader and follower voltage regulator controllers 610 and 620. At step 710, a difference in measured power factors between the power output by the first and second voltage regulators 630 and 640 is compared to a user-defined maximum difference. For example, if the power factor of the power output by the first voltage regulator 630 is measured to be 0.95, the power factor of the power output by the second voltage regulator 640 is measured to be 0.8, and the user defined maximum difference is 0.1, then the condition at step 710 is true, and the process proceeds to step 720.

At step 720, an average of the line voltages output by each phase is calculated and compared with a user-defined voltage set for regulation. If the average voltage is equal to or greater than the set voltage for regulation, the process proceeds to step 722, where the difference in power factor measured between the power output by the first and second voltage regulators 630 and 640 is stored in memory (i.e., as Δ1, for example). At step 724, the follower voltage regulator controller 620 commands the second voltage regulator 640 to a lower tap position. At step 726, the difference in power factor is compared with the previous value stored in memory, to determine if it is lower than the previous value. In other words, after lowering the tap position of the second voltage regulator 640, the difference in power factor is again measured between the power output by the first and second voltage regulators 630 and 640 and compared with the difference in power factor measured before the tap position of the second voltage regulator 640 was lowered. If it is lower, the process proceeds back to step 710 to determine whether the new difference in power factor is less than the user-defined maximum.

Alternatively, at step 720, if the average voltage is not equal to or greater than the set voltage for regulation (i.e., less than), the process proceeds to step 723, where the difference in power factor measured between the power output by the first and second voltage regulators 630 and 640 is stored in memory (i.e., as Δ1, for example). At step 725, the leader voltage regulator controller 610 commands the first voltage regulator 630 to a higher tap position. It is noted that, as compared to step 724, it is acceptable to command the first voltage regulator 630 to a higher tap position at step 725, because the average voltage was not found to be equal to or greater than the set voltage for regulation at step 720. At step 727, the difference in power factor is compared with the previous value stored in memory, to determine if it is lower than the previous value. If it is lower, the process proceeds back to step 710 to determine whether the new difference in power factor is less than the user-defined maximum.

Returning to step 726, if the difference in power factor is compared with the previous value and determined to be higher than the previous value, the process proceeds to step 728 where the follower voltage regulator controller 620 commands the second voltage regulator 640 to increase tap positions. It is noted that, because the difference in power factor after the tap-down command at step 724 was not determined at step 726 to be less than the difference stored at step 722, the tap-down command at step 724 is undone by the tap-up command at step 728, effectively returning the system to its original state. The process then proceeds to step 740 where a corresponding process of steps is performed.

Similarly, returning to step 727, if the difference in power factor is compared with the previous value and determined to be higher than the previous value, the process proceeds to step 729 where the leader voltage regulator controller 610 commands the first voltage regulator 630 to decrease tap positions. It is noted that, because the difference in power factor after the tap-up command at step 725 was not determined at step 727 to be less than the difference stored at step 723, the tap-up command at step 725 is undone by the tap-down command at step 729, effectively returning the system to its original state. The process then proceeds to step 740 where a corresponding process of steps is performed.

The process of steps 740 and 742-749 are similar to steps 720 and 722-729, respectively, except that, at step 744, the leader voltage regulator controller 610 commands the first voltage regulator 630 to increase tap positions at step 744 rather than the follower voltage regulator controller 620 commanding the second voltage regulator 640 to increase tap positions (as at step 724). Thus, steps 740 and 742-749 represent an opposite approach to the reduction of the power factor difference as compared to steps 720 and 722-729.

In alternative embodiments of method 700, the process may proceed directly to step 740 rather than 720 after the decision at step 710 and only return to step 720 if steps 740 and 742-749 fail to reduce the difference in power factor. In another embodiment, a record of success of power factor difference reduction by steps 720 and 722-729 and a record of success of power factor difference reduction by steps 740 and 742-749 may be stored. In this case, after step 710, the process may proceed to either step 720 or 740 based on a prior history of power factor difference reduction success, determined with reference to the stored records.

Referring again to FIG. 1, in certain example embodiments, the multi-phase control system 100 is able to monitor and control voltage deltas and phase angles between the three phases being regulated by controlling each of the tap changers 132, 142, and 152 independently. As discussed above, the sense signals 138, 148, and 158 provide feedback from the respective voltage regulators 134, 144, and 154 to the regulator controllers 130, 140, and 150. In certain example embodiments, the sense signals 138, 148, and 158 each include data regarding the waveshapes of the respective phase. The waveshapes of the three phases can be compared to each other to calculate a voltage delta and a phase angle between each of the three phases. Thus, one or more of the three respective tap changers 132, 142, and 152 can be independently controlled to adjust and correct and/or improve voltage delta and phase angle balance.

Figure 8:
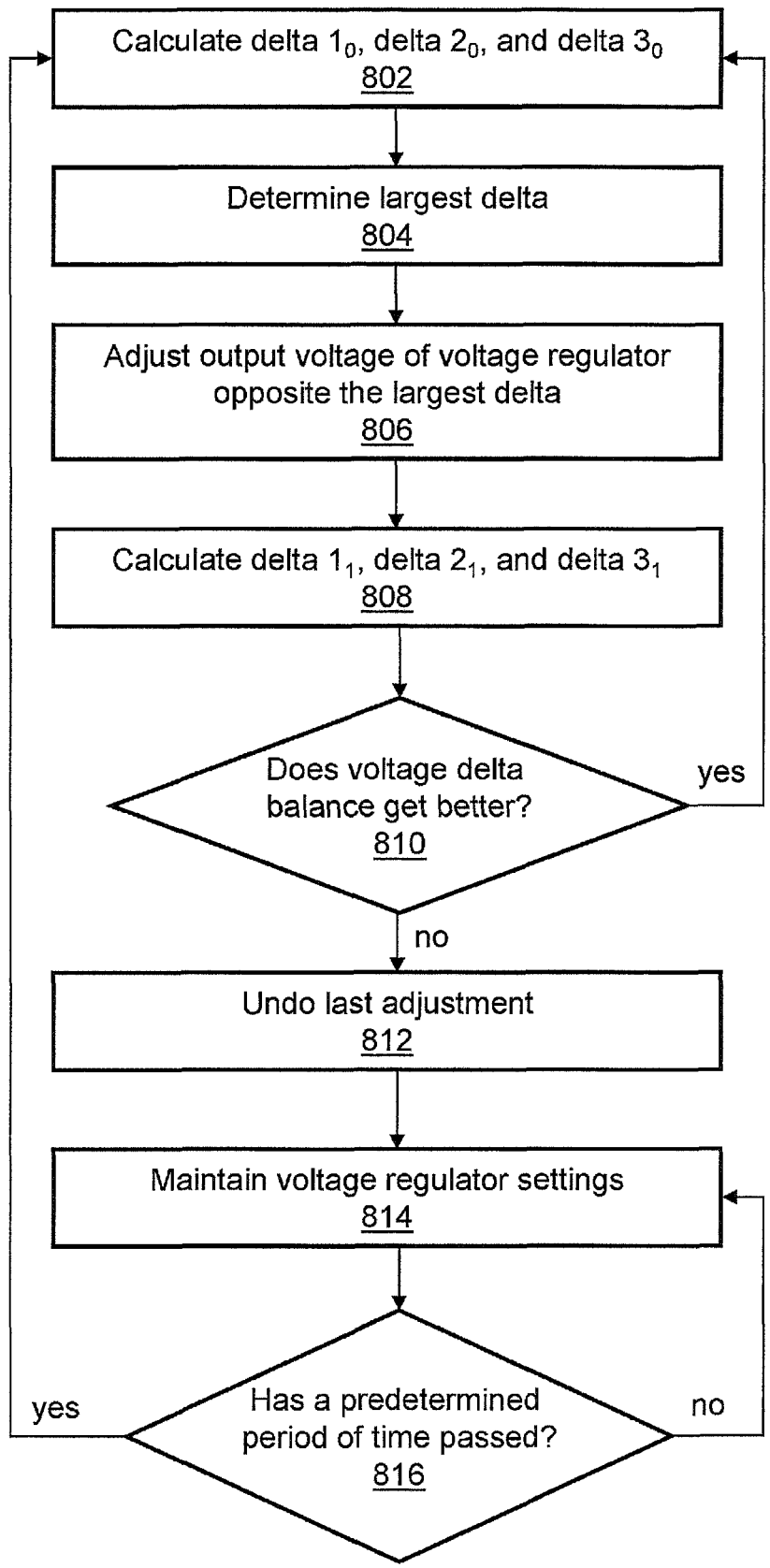
FIG. 8 illustrates a flow chart of a method for voltage delta balancing, in accordance with an example embodiment of the present disclosure.
Figure 10A:
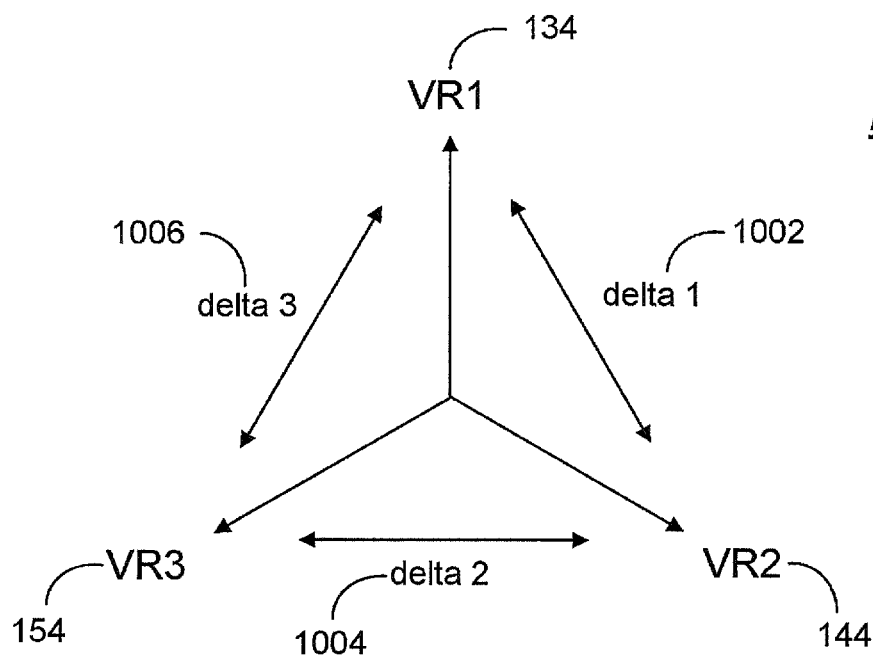
FIG. 10A illustrates a voltage delta vector diagram, in accordance with an example embodiment of the present disclosure.

FIG. 8 illustrates a method of monitoring and controlling voltage deltas between phases in accordance with an example embodiment of the disclosure. FIG. 10A illustrates a vector diagram of the three phases 134, 144, and 154, and respective voltage deltas 1002, 1004, and 1006 between the three phases. As discussed above, the regulator controllers 130, 140, and 150 receive sense signals 138, 148, and 158 which contain data regarding the voltages of the respective phases. Referring to FIGS. 8 and 10A, in step 802 of the monitoring and control method, the multi-phase control system 100 uses this data to calculate an initial voltage delta or difference between each of the phases. For example, the initial voltage difference between the first phase 134 and the second phase 144 may be designated as delta $1_0$ 1002, the initial voltage difference between the second phase 144 and the third phase 154 may be designated as delta $2_0$ 1004, and the initial voltage difference between the third phase 154 and the first phase 134 may be designated as delta $3_0$ 1006. In step 804, the largest delta value is determined. In step 806, the output voltage of the phase or voltage regulator 134, 144, 154 opposite of the largest delta value is adjusted. For example, if the largest delta value is delta $1_0$ 1002, which denotes the voltage differential between the first 134 and second 144 phases, then the tap position of the voltage regulator corresponding to the third phase 154 is adjusted to adjust the output voltage of the third phase.

Subsequently, in step 808, new voltage differentials (i.e., deltas) are calculated, and the new deltas may be denoted as delta $1_1$, delta $2_1$, and delta $3_1$, respectively. In step 810, the new deltas are compared to determine if the voltage balance between the new deltas (delta $1_1$, delta $2_1$, and delta $3_1$,) is better than the balance between the initial deltas (delta $1_0$, delta $2_0$, and delta $3_0$,). If the balance is indeed better, then the process is repeated from step 802 until the balance between the new deltas is not better than the initial deltas. When the balance is not better, the process goes to step 812, where the latest voltage regulator adjustment is undone, putting the system into an optimized voltage balance condition between the three phases. Thus, in step 814, the current voltage regulator settings are maintained.

In certain example embodiments, the multi-phase control system 100 periodically reconfirms that the system is in the optimized voltage delta balance condition. In such example embodiments, the method includes step 816, in which it is determined whether or not a predetermined period of time has passed. If the predetermined period of time has passed, which means that it is time to reconfirm the optimized state, the method is repeated from step 802. If the predetermined period of time has not passed, then the current voltage regulator settings are maintained, as in step 814. The example method illustrated in FIG. 8 is simply one approach to balancing the voltage deltas in a three-phase system. In alternate embodiments, certain of the steps illustrated in the example method of FIG. 8 may be altered or removed. Likewise, a similar method can be applied to other types of multi-phase control systems.

Figure 9:
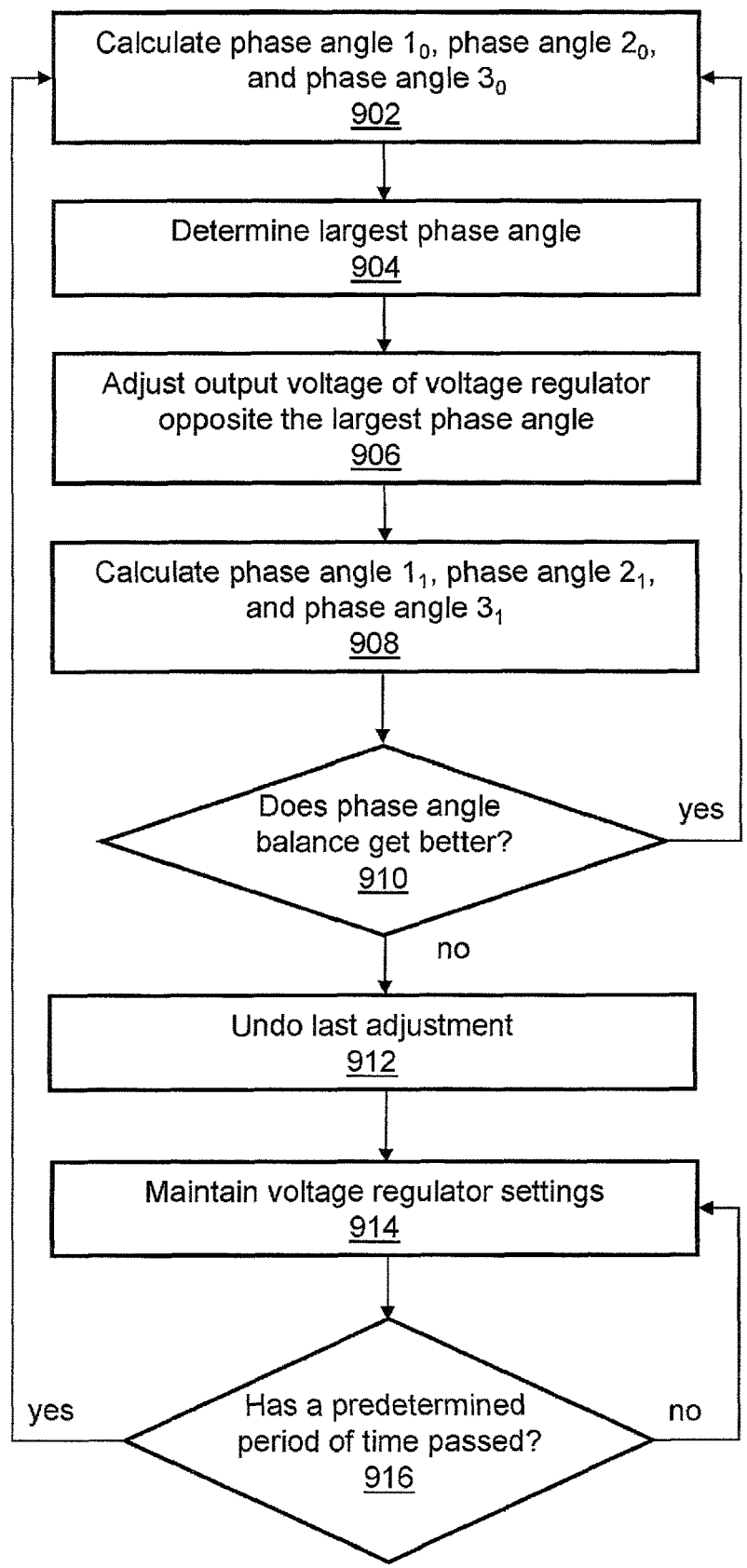
FIG. 9 illustrates a flow chart of a method for phase angle balancing, in accordance with an example embodiment of the present disclosure.
Figure 10B:
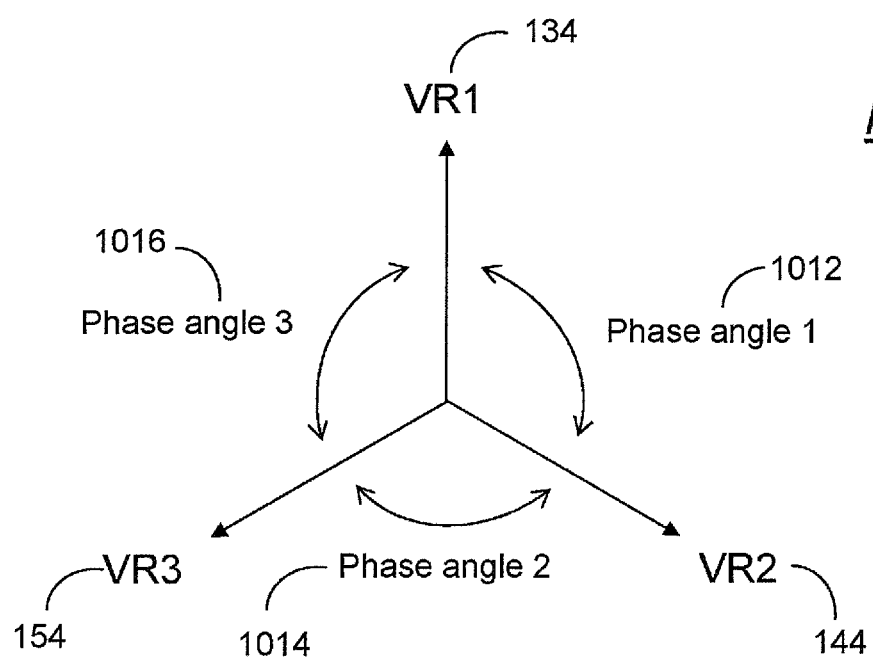
FIG. 10B illustrates a phase angle vector diagram, in accordance with an example embodiment of the present disclosure.

FIG. 9 illustrates a method of monitoring and controlling phase angles between phases in accordance with an example embodiment of the disclosure. FIG. 10B illustrates a vector diagram of the three phases 134, 144, and 154, and respective phase angles 1012, 1014, and 1016 between the three phases. Referring to FIGS. 9 and 10B, in step 902, the multi-phase control system uses measured data 138, 148, and 158 from the regulator controllers to calculate an initial set of phase angles associated with the three phases. For example, the initial phase angle between the first phase 134 and the second phase 144 may be designated as phase angle $1_0$ 1012, the initial phase angle between the second phase 144 and the third phase 154 may be designated as phase angle $2_0$ 1014, and the initial phase angle between the third phase 154 and the first phase 134 may be designated as phase angle $3_0$ 1016. In step 904, the largest phase angle is determined. In step 906, the output voltage of the voltage regulator 134, 144, 154 opposite of the largest phase angle is adjusted. For example, if the largest phase angle is phase angle $1_0$1012, which denotes the phase angle between the first 134 and second 144 phases, then the tap position of the voltage regulator corresponding to the third phase 154 is adjusted to adjust the output voltage of the third phase 154.

Subsequently, in step 908, new phase angles are calculated, and the new phase angles may be denoted as phase angle $1_1$, phase angle $2_1$, and phase angle $3_1$, respectively. In step 910, the new phase angles are compared to determine if the phase angle balance between the new phase angles (phase angle $1_1$, phase angle $2_1$, and phase angle $3_1$,) is better than the balance between the initial phase angles (phase angle $1_0$, phase angle $2_0$, and phase angle $3_0$,). If the balance is indeed better, then the process is repeated from step 902 until the balance between the new phase angle is not better than the initial phase angle. When the balance is not better, the process goes to step 912, where the latest voltage regulator adjustment is undone, putting the system into an optimized phase angle balance condition between the three phases. Thus, in step 914, the current voltage regulator settings are maintained.

In certain example embodiments, as similarly discussed above, the multi-phase control system 100 periodically reconfirms that the system is in the optimized phase angle balance condition in step 916. The example method illustrated in FIG. 9 is simply one approach to balancing the phase angles in a three-phase system. In alternate embodiments, certain of the steps illustrated in the example method of FIG. 9 may be altered or removed. Likewise, a similar method can be applied to other types of multi-phase control systems.

In certain example embodiments, controlling of the voltage regulators 134, 144, and 154 for either voltage delta or phase angle balancing is performed by the multi-phase control system 100 automatically as a present control scheme. In certain example embodiments, controlling of the voltage regulators 134, 144, and 154 is performed manually by an operator when it is determined that one or more of the tap changers 132, 142, and 152 should be adjusted to bring about a better voltage delta or phase angle balance. In certain example embodiments, the operator may set additional voltage settings for each of the three phases, including bandwidth and time delay settings, allowing for phase angle differentiation.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

What is claimed is:

1. A method of optimized power factor correction, comprising,
comparing, by a controller, a difference in measured power factors between two voltage regulators with a predetermined maximum difference;
when the difference is determined to be greater than the predetermined maximum difference, storing, by the controller, the difference as a previous difference in measured power factors;
adjusting, by the controller, a tap position of one of the voltage regulators;
comparing, by the controller, a second difference in measured power factors between the two voltage regulators with the previous difference in measured power factors; and
when the second difference in measured power factors is not less than the previous difference in measured power factors, returning, by the controller, the tap position of the one of the voltage regulators to a prior tap position.

2. The method of optimized power factor correction of claim 1, further comprising:
responsive to comparing a difference in measured power factors between two voltage regulators with the maximum difference and prior to storing the difference as the previous difference in measured power factors, comparing an average line voltage value associated with the two voltage regulators with a set voltage regulation value; and
when the average line voltage value is greater than or equal to the set voltage regulation value, set a first voltage regulator of the two voltage regulators to a lower tap position.

3. The method of optimized power factor correction of claim 2, comprising:
when the average line voltage value is not greater than or equal to the set voltage regulation value, set a second voltage regulator of the two voltage regulators to a higher tap position.

4. The method of optimized power factor correction of claim 2, further comprising:
responsive to returning the tap position of the one of the voltage regulators to the prior tap position, comparing a second average line voltage value associated with the two voltage regulators with the set voltage regulation value; and
when the second average line voltage value is greater than or equal to the set voltage regulation value, set a second voltage regulator of the two voltage regulators to a lower tap position.

5. The method of optimized power factor correction of claim 4, further comprising:
when the second average line voltage value is not greater than or equal to the set voltage regulation value, set a first voltage regulator of the two voltage regulators to a higher tap position.

6. The method of optimized power factor correction of claim 1, wherein the predetermined maximum difference is a user-defined maximum difference.

7. The method of optimized power factor correction of claim 1, further comprising:
when the second difference in measured power factors is less than the previous difference in measured power factors, comparing, by the controller, the second difference in measured power factors with the maximum difference; and
when the second difference is determined to be less than the maximum difference, recording, by the controller, the adjusted the tap position of the one of the voltage regulators.

8. The method of claim 1, wherein the controller is a leader voltage regulator controller that is communicably coupled to a follower voltage regulator controller.

9. The method of claim 1, wherein the controller is a follower voltage regulator controller that is communicably coupled to a leader voltage regulator controller.

10. An optimized power factor correction system comprising:
a leader voltage regulator controller that is coupled to a first voltage regulator and configured to regulate a line output voltage of the first voltage regulator;
a follower voltage regulator controller that is coupled to a second voltage regulator and configured to regulate a line output voltage of the second voltage regulator,
wherein the follower voltage regulator controller is coupled to the leader voltage regulator controller; and
a load that is coupled to the first voltage regulator and the second voltage regulator and configured to be supplied with power from both the first voltage regulator and the second voltage regulator,
wherein the leader voltage regulator controller is configured to:
determine a difference in measured power factors between power output by the first voltage regulator and the second voltage regulator;
compare the difference with a predetermined maximum difference;
when the difference is determined to be greater than the maximum difference, storing the difference as a previous difference in measured power factors;
adjusting a tap position of one of the first voltage regulator and the second voltage regulator;
comparing a second difference in measured power factors between power output by the first voltage regulator and the second voltage regulator with the previous difference in measured power factors; and
when the second difference in measured power factors is not less than the previous difference in measured power factors, returning the tap position of the one of the first voltage regulator and the second voltage regulator to a prior tap position.

11. The system of claim 10, wherein the leader voltage regulator is further configured to:
when the second difference in measured power factors is less than the previous difference in measured power factors, compare the second difference in measured power factors with the maximum difference; and
when the second difference is determined to be less than the maximum difference, record the adjusted tap position of the one of the first voltage regulator and the second voltage regulator.

12. The system of claim 10, wherein the leader voltage regulator controller is configured to direct the follower voltage regulator controller.

13. The system of claim 10, wherein the first voltage regulator is a voltage regulator of one phase of a first power system, and wherein the second voltage regulator is another voltage regulator of the one phase of a second power system.

14. The system of claim 10, wherein the first voltage regulator and the second voltage regulator are voltage regulators of a common phase of two separate multi-phase power delivery systems and wherein the first voltage regulator and the second voltage regulator are connected in parallel to drive the load.

15. An optimized power factor correction system comprising:
 a leader voltage regulator controller that is coupled to a first voltage regulator and configured to regulate a line output voltage of the first voltage regulator;
 a follower voltage regulator controller that is coupled to a second voltage regulator and configured to regulate a line output voltage of the second voltage regulator,
  wherein the follower voltage regulator controller is coupled to the leader voltage regulator controller, and
  wherein the leader voltage regulator controller is configured to direct the follower voltage regulator controller; and
 a load that is coupled to the first voltage regulator and the second voltage regulator and configured to be supplied with power from both the first voltage regulator and the second voltage regulator,
  wherein the leader voltage regulator controller is configured to:
   determine a difference in measured power factors between power output by the first voltage regulator and the second voltage regulator;
   compare the difference with a predetermined maximum difference;
   when the difference is determined to be greater than the maximum difference, analyze a recorded prior history of one or more successful power factor difference reductions; and
   based on the recorded prior history of one or more successful power factor difference reductions, initiate an optimized power factor correction using a first power factor correction mode or a second power factor correction mode.

16. The system of claim 15, wherein to provide optimized power factor correction using the first power factor correction mode, the leader voltage power regulator controller is configured to:
 compare an average line voltage value associated with the first voltage regulator and the second voltage regulator with a set voltage regulation value;
 when the average line voltage value is greater than or equal to the set voltage regulation value,
  store the difference in measured power factors as a previous difference in measured power factors;
 set the first voltage regulator to a lower tap position;
 determine a second difference in measured power factors between power output by the first voltage regulator and the second voltage regulator;
 compare the second difference in measured power factors with the previous difference in measured power factors;
 when the second difference in measured power factors is not less than the previous difference in measured power factors,
  return the tap position of the first voltage regulator to a prior tap position; and
  initiate the second power factor correction mode; and when the second difference in measured power factors is less than the previous difference in measured power factors,
  compare the second difference in measured power factors with the maximum difference; and
  when the second difference is determined to be less than the predetermined maximum difference, record the adjusted tap position of the first voltage regulator to the prior history of one or more successful power factor difference reductions.

17. The system of claim 16, wherein to provide optimized power factor correction using the first power factor correction mode, the leader voltage power regulator controller is configured to:
 when the average line voltage value is less than the set voltage regulation value,
  store the difference in measured power factors as the previous difference in measured power factors;
 control the follower voltage regulator controller to set the second voltage regulator to a higher tap position;
 determine the second difference in measured power factors between power output by the first voltage regulator and the second voltage regulator;
 compare the second difference in measured power factors with the previous difference in measured power factors;
 when the second difference in measured power factors is not less than the previous difference in measured power factors,
  returning the tap position of the second voltage regulator to a prior tap position; and
  initiate the second power factor correction mode; and
 when the second difference in measured power factors is less than the previous difference in measured power factors,
  compare the second difference in measured power factors with the predetermined maximum difference; and
  when the second difference is determined to be less than the predetermined maximum difference, record the adjusted tap position of the second voltage regulator to the prior history of one or more successful power factor difference reductions.

18. The system of claim 15, wherein to provide optimized power factor correction using the second power factor correction mode, the leader voltage power regulator controller is configured to:
 compare an average line voltage value associated with the first voltage regulator and the second voltage regulator with a set voltage regulation value;
 when the average line voltage value is greater than or equal to the set voltage regulation value,
  store the difference in measured power factors as a previous difference in measured power factors;
 control the follower voltage regulator controller to set the second voltage regulator to a lower tap position;
 determine a second difference in measured power factors between power output by the first voltage regulator and the second voltage regulator;
 compare the second difference in measured power factors with the previous difference in measured power factors;
 when the second difference in measured power factors is not less than the previous difference in measured power factors,
  returning the tap position of the second voltage regulator to a prior tap position; and initiate the first power factor correction mode; and when the second difference in measured power factors is less than the previous difference in measured power factors, compare the second difference in measured power factors with the predetermined maximum difference; and when the second difference is determined to be less than the predetermined maximum difference, record the adjusted the tap position of the second voltage regulator to the prior history of one or more successful power factor difference reductions.

19. The system of claim 18, wherein to provide optimized power factor correction using the second power factor correction mode, the leader voltage power regulator controller is configured to:

when the average line voltage value is less than the set voltage regulation value, store the difference in measured power factors as a previous difference in measured power factors;

set the first voltage regulator to a higher tap position;

responsively, determine a second difference in measured power factors between power output by the first voltage regulator and the second voltage regulator;

compare the second difference in measured power factors with the previous difference in measured power factors;

when the second difference in measured power factors is not less than the previous difference in measured power factors, returning the tap position of the first voltage regulator to a prior tap position; and initiate the first power factor correction mode; and when the second difference in measured power factors is less than the previous difference in measured power factors, compare the second difference in measured power factors with the predetermined maximum difference; and when the second difference is determined to be less than the predetermined maximum difference, record the adjusted the tap position of the first voltage regulator to the prior history of one or more successful power factor difference reductions.

20. The system of claim 15, wherein the first voltage regulator and the second voltage regulator are voltage regulators of a common phase of two separate multi-phase power delivery systems, and wherein the first voltage regulator and the second voltage regulator are coupled in parallel to drive the load.

* * * * *